US012784377B2

(12) United States Patent
El Essaili et al.

(10) Patent No.: US 12,784,377 B2
(45) Date of Patent: Nov. 3, 2026

(54) ADJUSTING POSE OF VIDEO OBJECT IN 3D VIDEO STREAM FROM USER DEVICE BASED ON AUGMENTED REALITY CONTEXT INFORMATION FROM AUGMENTED REALITY DISPLAY DEVICE

(71) Applicant: Telefonaktiebolaget LM Ericsson (publ), Stockholm (SE)

(72) Inventors: Ali El Essaili, Aachen (DE); Natalya Tyudina, Aachen (DE); Esra Akan, Aachen (DE); Joerg Christian Ewert, Aachen (DE); Sai Zhang, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 266 days.

(21) Appl. No.: 18/578,797

(22) PCT Filed: Jul. 15, 2021

(86) PCT No.: PCT/EP2021/069675
§ 371 (c)(1),
(2) Date: Jan. 12, 2024

(87) PCT Pub. No.: WO2023/284958
PCT Pub. Date: Jan. 19, 2023

(65) Prior Publication Data
US 2024/0320931 A1 Sep. 26, 2024

(51) Int. Cl.
*G06T 19/00* (2011.01)
*G06T 19/20* (2011.01)
*G06V 40/16* (2022.01)

(52) U.S. Cl.
CPC ............ *G06T 19/006* (2013.01); *G06T 19/20* (2013.01); *G06V 40/168* (2022.01);
(Continued)

(58) Field of Classification Search
None
See application file for complete search history.

(56) References Cited

U.S. PATENT DOCUMENTS 11,159,766 B2 * 10/2021 Kies ........................ H04N 7/147
11,176,756 B1 * 11/2021 Bar-Zeev .............. G06F 3/0346
(Continued)

OTHER PUBLICATIONS

International Search Report and Written Opinion issued in International Application No. PCT/EP2021/069675 dated Mar. 29, 2022 (13 pages).

(Continued)

*Primary Examiner* — Ryan M Gray
(74) *Attorney, Agent, or Firm* — Rothwell, Figg, Ernst & Manbeck, P.C.

(57) ABSTRACT

An augmented reality. AR, computing server (200) includes a network interface (202), a processor (204), and a memory (206) storing instructions executable by the processor to perform operations. The network interface is configured to receive through a network a three-dimensional (3D) video stream from a user device during a conference session. The operations identify a video object captured in the 3D video stream, and determine a pose of the video object captured in the 3D video stream. The operations obtain AR context information from an AR display device indicating how the video object is to be posed relative to a physical object viewable through a see-through display of the AR display device, and adjust pose of the video object captured in the 3D video stream based on the AR context information. The operations output the video object to the see-through display for display. Related methods and computer program products are disclosed.

20 Claims, 4 Drawing Sheets

(52) U.S. Cl.
CPC ................. *G06T 2219/2012* (2013.01); *G06T 2219/2016* (2013.01); *G06V 2201/07* (2022.01)

(56) References Cited

U.S. PATENT DOCUMENTS

| | | | | |
|---|---|---|---|---|
| 11,689,696 | B2 * | 6/2023 | Lin | H04N 7/157<br>348/14.03 |
| 11,847,752 | B2 * | 12/2023 | Bar-Zeev | G06F 3/0346 |
| 2010/0085416 | A1 * | 4/2010 | Hegde | H04N 7/157<br>348/E7.083 |
| 2013/0044128 | A1 * | 2/2013 | Liu | G02B 27/017<br>345/633 |
| 2015/0213650 | A1 * | 7/2015 | Barzuza | H04L 67/131<br>348/14.07 |
| 2015/0215581 | A1 | 7/2015 | Barzuza et al. | |
| 2018/0176508 | A1 * | 6/2018 | Pell | H04L 65/1089 |
| 2024/0282020 | A1 * | 8/2024 | Williams | G06T 7/90 |

OTHER PUBLICATIONS

Kantonen, T. et al., "Mixed Reality in Virtual World Teleconferencing", Virtual Reality Conference, IEEE, 2010 (pp. 179-182).

* cited by examiner

ADJUSTING POSE OF VIDEO OBJECT IN 3D VIDEO STREAM FROM USER DEVICE BASED ON AUGMENTED REALITY CONTEXT INFORMATION FROM AUGMENTED REALITY DISPLAY DEVICE

CROSS REFERENCE TO RELATED APPLICATIONS

This application is a 35 U.S.C. § 371 National Stage of International Patent Application No. PCT/EP2021/069675, filed 2021 Jul. 15.

TECHNICAL FIELD

The present disclosure relates to rendering augmented reality (AR) environments and associated AR computing servers, such as network server, and AR display devices, and related operations for displaying video objects through AR display devices.

BACKGROUND

Immersive virtual reality (VR) environments have been developed which provide VR environments for on-line conferencing in which computer generated avatars represent locations of human participants in the meetings. Example software products that provide VR environments for on-line conferencing include MeetinVR, Glue, FrameVR, Engage, BigScreen VR, Mozilla Hubs, AltSpace, Rec Room, Spatial, and Immersed. Example user devices that can display VR environments to participants include Oculus Quest VR headset, Oculus Go VR headset, and personal computers and smart phones running various VR applications.

In contrast to VR environments where human participants only see computer generated graphical renderings, human participants using augmented reality (AR) environments see a combination of computer-generated graphical renderings overlaid on a view of the physical real-world through, e.g., see-through display screens. AR environments are also referred to as mixed reality environments because participants see a blended physical and digitally rendered world. Example user devices that can display AR environments include Google Glass, Microsoft HoloLens, Vuzix, and personal computers and smart phones running various AR applications. There is a need to provide on-line conferencing capabilities in an AR environment.

SUMMARY

Some embodiments disclosed herein are directed to an AR computing server that includes a network interface, a processor, and a memory storing instructions executable by the processor to perform operations. The network interface is configured to receive through a network a three-dimensional (3D) video stream from a user device during a conference session. The operations identify a video object captured in the 3D video stream, and determine a pose of the video object captured in the 3D video stream. The operations obtain AR context information from an AR display device indicating how the video object is to be posed relative to a physical object viewable through a see-through display of the AR display device, and adjust pose of the video object captured in the 3D video stream based on the AR context information. The operations output the video object to the see-through display for display.

In some further embodiments the operation to determine the pose of the video object captured in the 3D video stream, includes to determine pose of features of a face captured in the 3D video stream, the operation to adjust pose of the video object captured in the 3D video stream based on the AR context information includes to rotate and/or translate the features of the face captured in the 3D video stream based on comparison of the pose of the features of the face captured in the 3D video stream to the AR context information indication of how the features of the face are to be posed relative to the physical object viewable through the see-through display of the AR display device.

Some other related embodiments are directed to a corresponding method by an AR computing server. The method includes identifying a video object captured in a 3D video stream received from a user device during a conference session, and determining a pose of the video object. The method obtains AR context information from an AR display device indicating how the video object is to be posed relative to a physical object viewable through a see-through display of the AR display device, and adjusts pose of the video object captured in the 3D video stream based on the AR context information. The method outputs the video object to the see-through display for display.

Some other related embodiments are directed to a corresponding computer program product including a non-transitory computer readable medium storing instructions executable by at least one processor of an AR computing server to perform operations. The operations identify a video object captured in a 3D video stream received from a user device during a conference session, and determine a pose of the video object. The operations obtain AR context information from an AR display device indicating how the video object is to be posed relative to a physical object viewable through a see-through display of the AR display device, and adjust pose of the video object captured in the 3D video stream based on the AR context information. The operations output the video object to the see-through display for display.

Some other related embodiments are directed to a corresponding AR computing server configured to identify a video object captured in a 3D video stream received from a user device during a conference session, and determine a pose of the video object. The AR computing server is further configured to obtain AR context information from an AR display device indicating how the video object is to be posed relative to a physical object viewable through a see-through display of the AR display device, and adjust pose of the video object captured in the 3D video stream based on the AR context information. The AR computing server is further configured to output the video object to the see-through display for display.

Some potential advantages of these embodiments is they enable a human participant during a conference to view through a see-through display of an AR display device a video object, such as another participant, which is being displayed with a pose that is determined based on AR context information. The AR computing server can use various characteristics of AR context information to determine how to pose and scale an image of the video object, such as where to pose a video image of the other participant within a room.

Other AR computing servers, methods, and computer program products according to embodiments will be or become apparent to one with skill in the art upon review of the following drawings and detailed description. It is intended that all such additional AR computing servers, methods, and computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Embodiments of the present disclosure are directed to providing on-line conferencing capabilities in an AR environment. The AR environment can enable a local participant in a conference to visually experience an immersive presence of a remote participant who's video image is posed relative to real-world physical objects that the local participant views through a see-through display of an AR display device (e.g., AR glasses worn by the local participant).

Figure 1A:
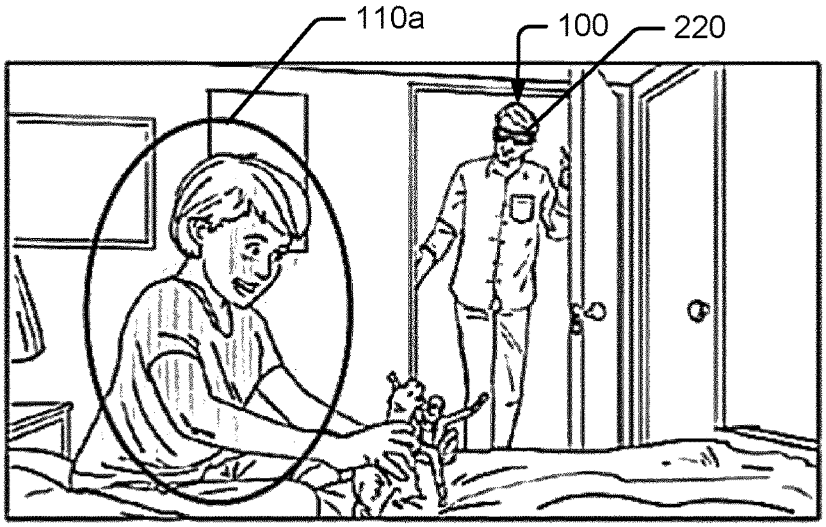
FIGS. 1A-1C illustrate a sequence of scenarios in which a local participant of an on-line conference is viewing a remote participant through an AR display device during a video conference and in which a video image of the remote participant is posed based on AR context information in accordance with some embodiments of the present disclosure.
Figure 1B:
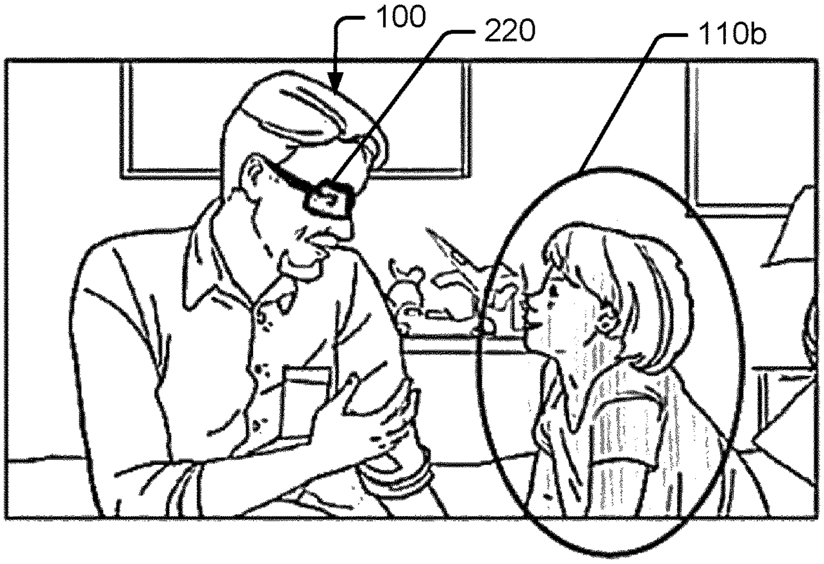
Figure 1C:
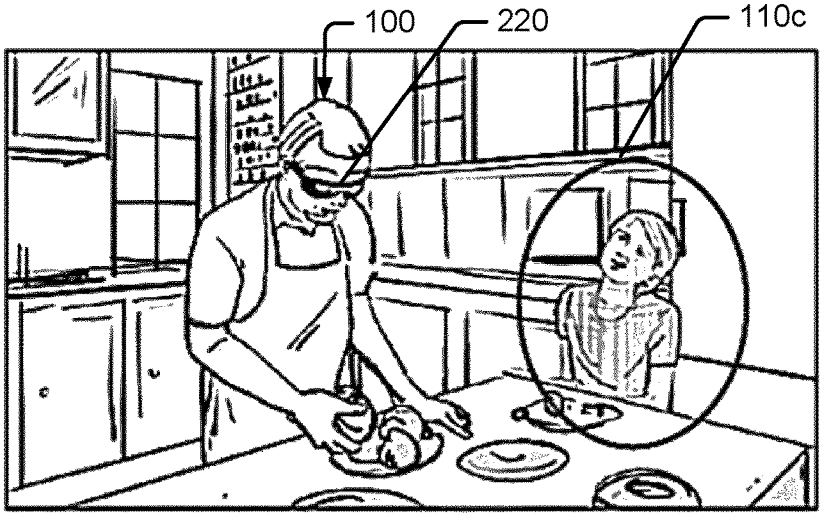

FIGS. 1A-1C illustrate a sequence of scenarios in which a local participant of an on-line conference is viewing a remote participant through an AR display device and in which a video image of the remote participant is posed based on AR context information in accordance with some embodiments of the present disclosure.

Figure 2:
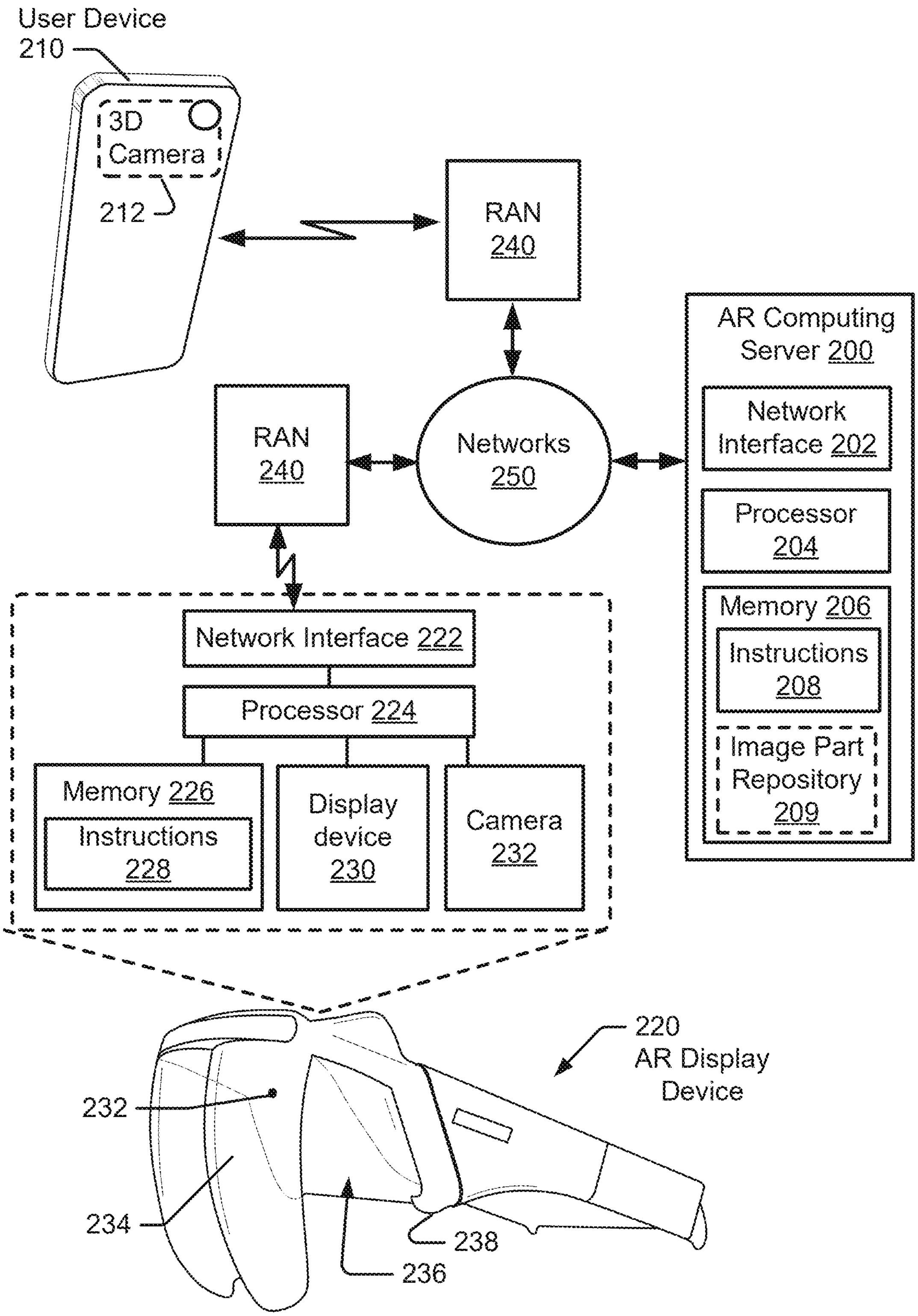
FIG. 2 illustrates an AR system that includes a user device which provides a 3D video stream of a user to an AR computing server which poses an image of the remote participant for display through an AR display device in accordance with some embodiments of the present disclosure.

Referring to FIG. 1A, a local participant 100 during an on-line conference session is wearing an AR display device 220, illustrated as AR glasses or other AR headset, and views a video image 110*a* of a remote participant of the on-line conference session which is generated by an AR computing server 200 (shown in FIG. 2). The video image 110*a* of the remote participant is displayed through the AR display device 220 with a pose that is adjusted by the AR computing server 200 based on AR context information obtained by the AR display device 220. As will be explained in further detail below, the AR context information may indicate a real-world physical object which is viewed by the local participant 100 and, relative to which, the video image 110*a* of the remote participant is to be posed (e.g., rotated, scaled, and/or anchored). In FIG. 1A, the AR context information may indicate that the video image 110*a* of the remote participant is to be posed relative to a bed or other furniture in the room. The video image 110*a* may be anchored by the AR computing server 200 relative to the bed or other furniture, so that when the local participant's 100 view becomes rotated toward the bed or furniture the video image 110*a* becomes displayed with a pose that is superimposed on the real-world, such as being posed resting on the bed or furniture. The AR context information may select one of a plurality of real-world physical objects (e.g., the bed in FIG. 1A) which are captured in a video stream from a camera of the AR display device 220. The selected one of a plurality of real-world physical objects is associated by the AR computing server 200 with the video image 110*a* of the remote participant. The video image 110*a* of the remote participant is then posed (e.g., by adjusting location and angular orientation of the displayed video image 110*a* of the remote participant's head) and scaled in size (e.g., by adjusting size of the displayed video image 110*a* of the remote participant's head), with operations by the AR computing server 200 so that when displayed on the see-through display of the AR display device 220 the video image 110*a* of the remote participant's head appears to the local participant 100 to be naturally posed relative to the selected real-world physical object as-if the remote participant were physically present at that location.

Referring to FIG. 1B, the local participant 100 has moved closer to the physical object (e.g., the bed or adjacent seat) where the video image 110*a* of the remote participant is posed and has changed his direction of view toward the video image of the remote participant. Accordingly, the AR context information is responsibly updated by the AR display device 220 to indicate the distance and relative poses between the local participant 100 and the video image of the remote participant. The operations by the AR computing server 200 respond to the updated context information by adjusting the pose (e.g., adjust location and angular orientation of the displayed remote participant's head) and scaling the size (e.g., adjust size of the displayed remote participant's head) so that when displayed through the see-through display of the AR display device 220 the adjusted video image 110*b* of the remote participant appears to the local participant 100 to be naturally posed relative to the selected real-world physical object as-if the remote participant were physically present at that location.

Referring to FIG. 1C, the local participant 100 has moved to a different room and the updated AR context information indicates a location in that room where the remote participant is to be posed. The AR context information may be generated by the AR display device 220, e.g., by tracking its movement and pose using motion sensors (such as accelerometers), and/or may be generated by the AR context server 200 such as by tracking movement of the AR display device 220 relative to real-world physical objects based on a video stream from a camera of the AR display device 220. The location may be designated by the local participant 100, such as by selecting the location while being viewed through the AR display device 220, and/or the location may be programmatically selected such as will be explained in further detail below. The operations by the AR context server 200 respond to the updated context information by adjusting the pose (e.g., adjust location and angular orientation of the displayed remote participant's head) and scaling the size (e.g., adjust size of the displayed remote participant's head) so that when displayed through the see-through display of the AR display device 220 the adjusted video image 110*c* of the remote participant appears to the local participant 100 to be naturally posed relative to the selected real-world physical object as-if the remote participant were physically present at that location, which is illustrated as being adjacent to a table in a kitchen.

Figure 3:
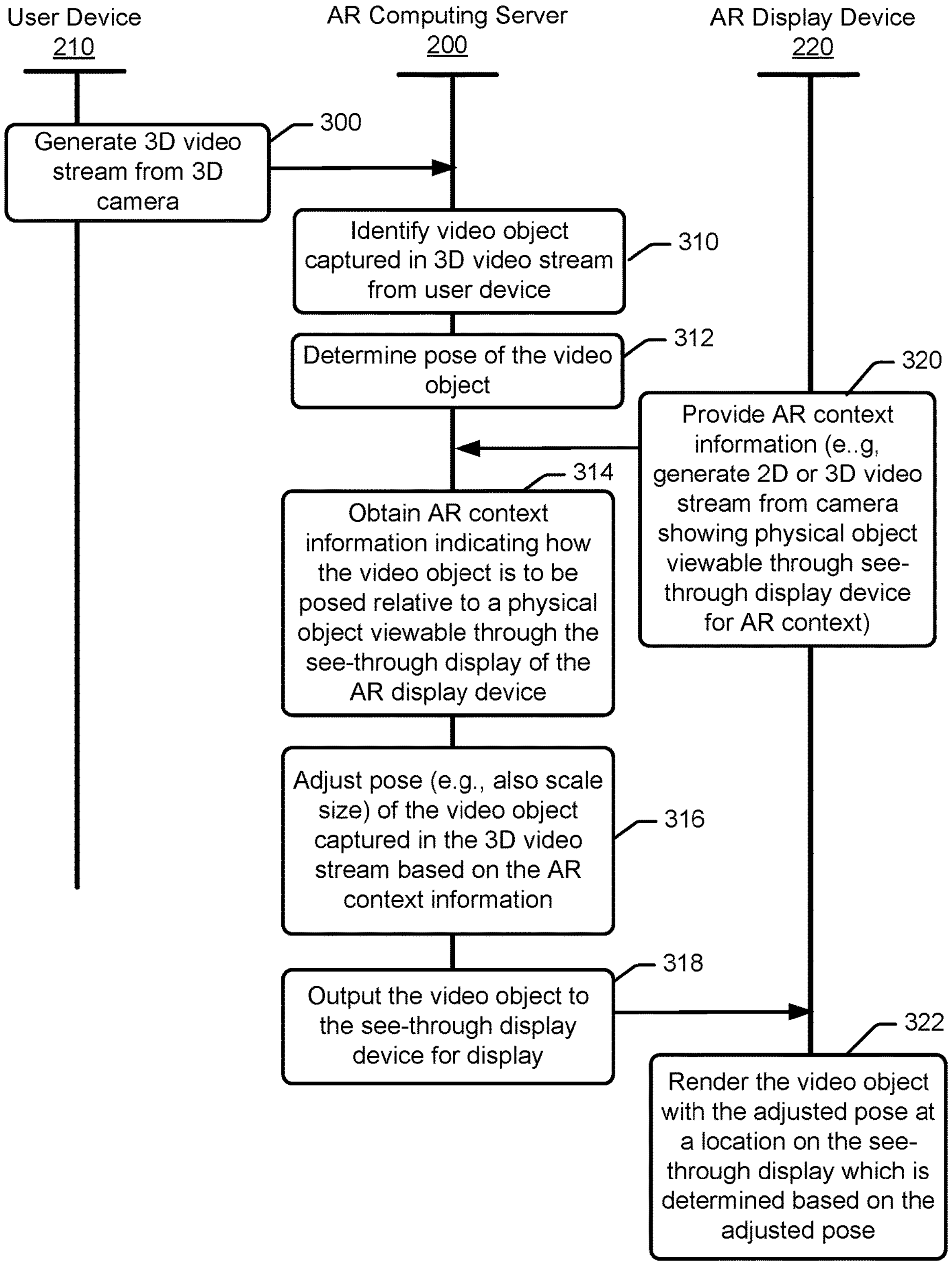
FIG. 3 illustrates a combined data flow diagram and flowchart of operations performed by a user device, an AR computing server, and an AR display device in accordance with some embodiments of the present disclosure.

FIG. 2 illustrates an AR system that includes a user device 210 which provides a 3D video stream of a user, such as the remote participant referenced in FIGS. 1A-1C, to the AR computing server 200. The AR computing server 200 poses an image of the user for display through the AR display device 220 in accordance with some embodiments of the present disclosure. FIG. 3 illustrates a combined data flow diagram and flowchart of operations performed by the user device 210, the AR computing server 200, and the AR display device 220 in accordance with some embodiments of the present disclosure.

Referring to FIGS. 2 and 3, the user device 210 uses a 3D camera 212 to generate 300 a 3D video stream during a conference session. The user device 210 may include, but is not limited to, a mobile phone, laptop computer, tablet computer, desktop computer, stand-alone network camera, etc. The 3D camera 212 may include, but is not limited to, a pair of stereo cameras, a Lidar sensor which maps distance to points on an object using a laser and measuring the time for the reflected light to return to a receiver, or another 3D camera device. The 3D video stream may include a pair of video streams from stereo cameras and/or may include processed information from stereo cameras or a Lidar sensor. Such processed information may include point clouds (e.g., collection of points that represent a 3D shape or feature), meshes (e.g., polygon meshes, triangular meshes, or other shaped meshes converted from point clouds), or color and depth information.

The 3D video stream is provided to the AR computing server 200 for processing via, for example, a radio access network 240 and networks 250 (e.g., private networks and/or public networks such as the Internet). The AR computing server 200 may be an edge computing server, a network computing server, a cloud computing server, etc. which communicates through the networks 250 with the user device 210 and the AR display device 220.

The AR computing server 200 includes at least one processor circuit 204 (referred to herein as "processor"), at least one memory 206 (referred to herein as "memory"), and at least one network interface 202 (referred to herein as "network interface"). Although the network interface 202 is illustrated as a wireless transceiver which communicates with a RAN 240, it may additionally or alternatively be a wired network interface, e.g., Ethernet. The processor 204 may include one or more data processing circuits, such as a general purpose and/or special purpose processor (e.g., microprocessor and/or digital signal processor), which may be collocated or distributed across the networks 250. The processor 204 is operationally connected to these various components. The memory 206, described below as a computer readable medium, stores executable instructions 208 that are executed by the processor 204 to perform operations.

Operations by the AR computing server 200 include identifying 310 a video object captured in the 3D video stream, and determining 312 a pose of the video object captured in the 3D video stream. The identification of the video object and determination of its pose may correspond to identifying presence and pose of various types of real-world physical objects in the 3D video stream. For example, the determination operation 312 may identify the pose of the face, body, and/or features of the face and/or body of the remote participant captured in the 3D video stream, such as by identifying pose of the head, eyes, lips, ears, neck, torso, arms, hands, etc. Additionally or alternatively, the determination operation 312 may identify the pose of furniture objects captured in the 3D video stream, such as a bed, seat, table, floor, etc. in the rooms illustrated in FIGS. 1A-1C.

The operations by the AR computing server 200 further include obtaining 314 AR context information from the AR display device 220 indicating how the video object is to be posed relative to a physical object viewable through a see-through display 234 of the AR display device 220. The operations adjust 316 pose of the video object captured in the 3D video stream based on the AR context information, and output 318 the video object to the see-through display 234 of the AR display device 220 for display. The AR display device 220 is configured to render 322 the video object at a location on the see-through display 234 which is determined based on the adjusted pose (operation 316).

In one embodiment, the AR context information obtained from the AR display device 220 can indicate, for example, pose of a chair, table, floor, etc. on which the video object (e.g., video image of the remote participant in FIGS. 1A-1C) is to be posed through the see-through display 234. The AR context information can indicate a pose of the physical object, and the operation by the AR computing server 200 to adjust 316 pose of the video object captured in the 3D video stream based on the AR context information can include to adjust pose of the video object captured in the 3D video stream based on comparison of the pose of the video object to the pose of the physical object.

In one embodiment, the AR context information provided 320 by the AR display device 220 indicates where a user of the AR display device 220 has designated that the video object with the adjusted pose is to be displayed. For example, the user may designate a real-world physical object, such as a seat, table, bed, floor, etc., in a room where the video object is to be displayed and anchored relative to the real-world physical object. Referring to the illustrative example of FIG. 1A, the user can designate a physical chair next to the bed where the video image 110*a* of the upper body of the remote participant is to be displayed and anchored. The AR display device 220 may provide a video stream from a camera 232 (e.g., 2D or 3D camera) which captures the designated physical chair. The AR computing server 200 then operates to adjust 316 the pose of the upper body of the remote participant captured in the 3D video stream based on the pose of the physical chair in the video stream from the camera 232 and/or based on other AR context information (e.g., input by the user and/or generated by the AR display device 220) so that the upper body of the remote participant is viewed by the user through the see-through display 234 as virtually sitting on the designated physical chair next to the bed.

In one embodiment, the AR context information can be obtained by determining pose of the physical object in a video stream from the camera 232 of the AR display device 220. The operation by the AR computing server 200 to obtain 314 the AR context information can include to determine a pose of the see-through display 234 of the AR display device 220 relative to the physical object captured in a video stream from a camera 232 of the AR display device

220. The operation to adjust 316 pose of the video object captured in the 3D video stream can include to adjust pose of the video object captured in the 3D video stream based on comparison of the pose of the video object to the pose of the see-through display 234 of the AR display device 220 relative to the physical object captured in a video stream from the camera 232 of the AR display device 220.

In the example of FIG. 2, the AR display device 220 includes at least one processor circuit 224 (referred to herein as "processor"), at least one memory 226 (referred to herein as "memory"), at least one network interface 222 (referred to herein as "network interface"), and a display device 230. The AR display device 220 may include the camera 232 which is configured to output a video stream capturing images of what the user (e.g., local participant) is presently viewing. Although the network interface 222 is illustrated as a wireless transceiver which communicates with a RAN 240, it may additionally or alternatively be a wired network interface, e.g., Ethernet. The processor 224 may include one or more data processing circuits, such as a general purpose and/or special purpose processor (e.g., microprocessor and/or digital signal processor), which may be collocated or distributed across the networks 250. The processor 224 is operationally connected to these various components. The memory 226, described below as a computer readable medium, stores executable instructions 228 that are executed by the processor 224 to perform operations.

In the illustrated example, the display device 230 is part of a mobile electronic device 236 which is releasably held by a head-wearable frame 238 oriented relative to the see-through display screen 234. The display device 236 is arranged to display information that is projected on the see-through display screen 234 for reflection directly or indirectly toward the user's eyes, i.e., while wearing the frame 238. Although not shown, the frame 238 may include intervening mirrors that are positioned between the see-through display screen 234 and the user's eyes and, hence the light may be reflected directly or indirectly toward the user's eyes.

In some other embodiments, the see-through display is part of the display device 230 which operates to superimpose the adjusted pose video image received from the AR computing server 200 on a video stream of the real-world captured by the camera 232. For example, a user holding the mobile electronic device 236 can view through the display device 230 a video stream from the camera 232 of a room, e.g., including the chair and bed shown in FIG. 1A. The processor 224 can operate to combine (superimpose) the video stream from the camera 232 with the video object (e.g., the video image 110*a* of the remote participant's body) with the adjusted pose (operation 316) received from the AR computing server 200. Thus, in the context of FIG. 1A, the user holding the mobile electronic device 236 can view on the display device 230 the video stream from the camera 232 of the room and when the user looks at the physical chair (anchored to the video image 110*a*) the video image 110*a* of the remote participant's body is superimposed on the physical chair. Thus, the see-through display referenced herein may, for example, be a partially reflective screen, such as the display 234 in FIG. 2, or may be a display device on which a video object captured by a remote camera of a user device 210 is superimposed on a video steam of the real-world captured by a local camera of the AR display device 220.

As used herein, the term "pose" refers to the position and/or the orientation of a video object relative to a defined coordinate system (e.g., a video frame from the 3D camera 212 or the user device 210) or may be relative to another device (e.g., the AR display device 220). A pose may therefore be defined based on only the multidimensional position of one device relative to another device or to a defined coordinate system, only on the multidimensional orientation of the device relative to another device or to a defined coordinate system, or on a combination of the multidimensional position and the multidimensional orientation.

Figure 4:
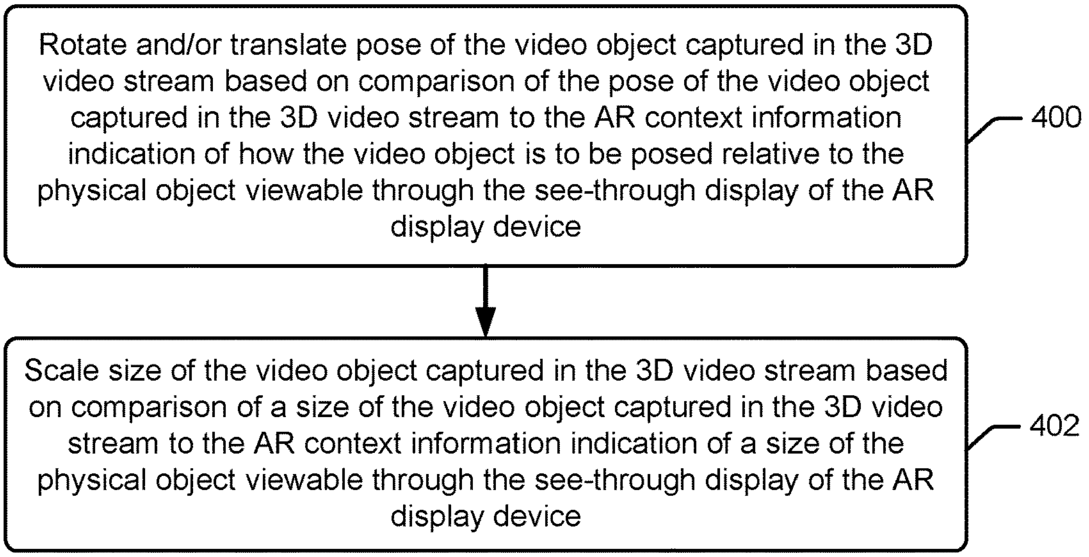
FIGS. 4 and 5 illustrate flowcharts of operations that can be performed by the AR computing server of FIGS. 2 and 3 in accordance with some embodiments of the present disclosure.

FIG. 4 illustrates a flowchart of operations that can be performed by the AR computing server 200 of FIGS. 2 and 3 in accordance with some embodiments of the present disclosure.

Referring to FIGS. 3 and 4, the operation to adjust 316 pose of the video object captured in the 3D video stream can include to rotate and/or translate pose 400 of the video object captured in the 3D video stream (e.g., rotate and/or translate location of the video image 110*a* of the remote participant's body in FIG. 1A) based on comparison of the pose of the video object captured in the 3D video stream to the AR context information indication of how the video object is to be posed relative to the physical object viewable through the see-through display 234 of the AR display device 220. In a further embodiment, the operation to adjust 316 pose of the video object captured in the 3D video stream further includes to scale size 402 of the video object captured in the 3D video stream based on comparison of a size of the video object captured in the 3D video stream to the AR context information indication of a size of the physical object viewable through the see-through display 234 of the AR display device 220.

In a further example embodiment, the operation to determine 312 the pose of the video object captured in the 3D video stream, can include to determine pose of features of a face captured in the 3D video stream. In the example of FIG. 1A, the pose of the remote participant's head, eyes, ears, lips, etc. captured in the 3D video stream can be determined 312. The operation to adjust 316 pose of the video object captured in the 3D video stream based on the AR context information can include to rotate and/or translate the features of the face captured in the 3D video stream based on comparison of the pose of the features of the face captured in the 3D video stream to the AR context information indication of how the features of the face are to be posed relative to the physical object viewable through the see-through display 234 of the AR display device 220.

As explained above, the AR context information can be obtained by determining pose of the physical object in a video stream from the camera 232 of the AR display device 220. The AR computing server 200 may be configured to use a context selection rule to automatically select which physical object among a plurality of physical objects which are captured in a video stream from the camera 232 of the AR display device 220. The operation to determine 312 (FIG. 3) the pose of the see-through display 234 of the AR display device 220 relative to the physical object captured in the video stream from the camera 232 of the AR display device (220), includes to identify poses of a plurality of physical objects captured in the video stream from the camera 232 of the AR display device 220, and to select one of the physical objects from among the plurality of physical objects based on the selected one of the physical objects satisfying a context selection rule. The operation then performs the determination of the pose of the see-through display 234 relative to the pose of the selected one of the physical objects.

Some illustrative non-limiting examples of context selection rule operations are explained. In one embodiment, the operation by the AR computing server 200 includes to determine that one of the physical objects captured in the video stream from the camera 232 of the AR display device 220 satisfies the context selection rule based on the one of the physical objects having a shape that matches a defined shape of one of: a seat on which the video object captured in the 3D video stream is to be displayed on the see-through display 234 with a pose viewed as appearing to be supported by the seat; a table on which the video object captured in the 3D video stream is to be displayed on the see-through display 234 with a pose viewed as appearing to be supported by the table; and a floor on which the video object captured in the 3D video stream is to be displayed on the see-through display 234 with a pose viewed as appearing to be supported by the floor.

In some further operational embodiments, the AR computing server 200 operates to adjust color and/or shading of the video object in the video stream from the user device 210 based on color and/or shading of the real-world physical object being viewed by the user operating the AR display device 220 in combination with the displayed video object with the adjusted pose. In one embodiment, operation by the AR computing server 200 includes to adjust color and/or shading of the physical object which is output to the see-through display 234 for display, based on color and/or shading of the physical object captured in the video stream from the camera 232 of the AR display device 220.

As a local participant moves about a room while viewing through the AR display device 220 the video image of a remote participant posed relative to a real-world physical object, the relative positioning between the location of the local participant in the virtual location of the posed video image of the remote participant can result in substantial range of adjustments being made to the pose (e.g., rotation and translation) and scaling of size of the remote participant's body being viewed. Some poses may result in the upper torso and head of the remote participant to be viewed through the AR display device 220 while some other poses may result in only the head or portion of the head being viewed. Moreover, how much of the remote participant's body is captured in the 3D video stream from the user device 210 may change over time due to, for example, the remote participant moving relative to the camera 212 of the user device 210. To facilitate generation of any desired pose and scaling of the video image of the remote participant, some other operational embodiments of the AR computing server 200 combine a previously stored image of an extended part (e.g., part of the remote participant's body) of an earlier video object to the video object (e.g., remote participant's head) that is presently captured in the 3D video stream. The extended part may be stored in an image part repository 209 in the memory 206 of the AR computing server 200 as shown in FIG. 2. For example, these operations may append the earlier image of a body of the remote participant in FIGS. 1A-1C to the image of the remote participant's face which is presently captured in the 3D video stream.

Figure 5:
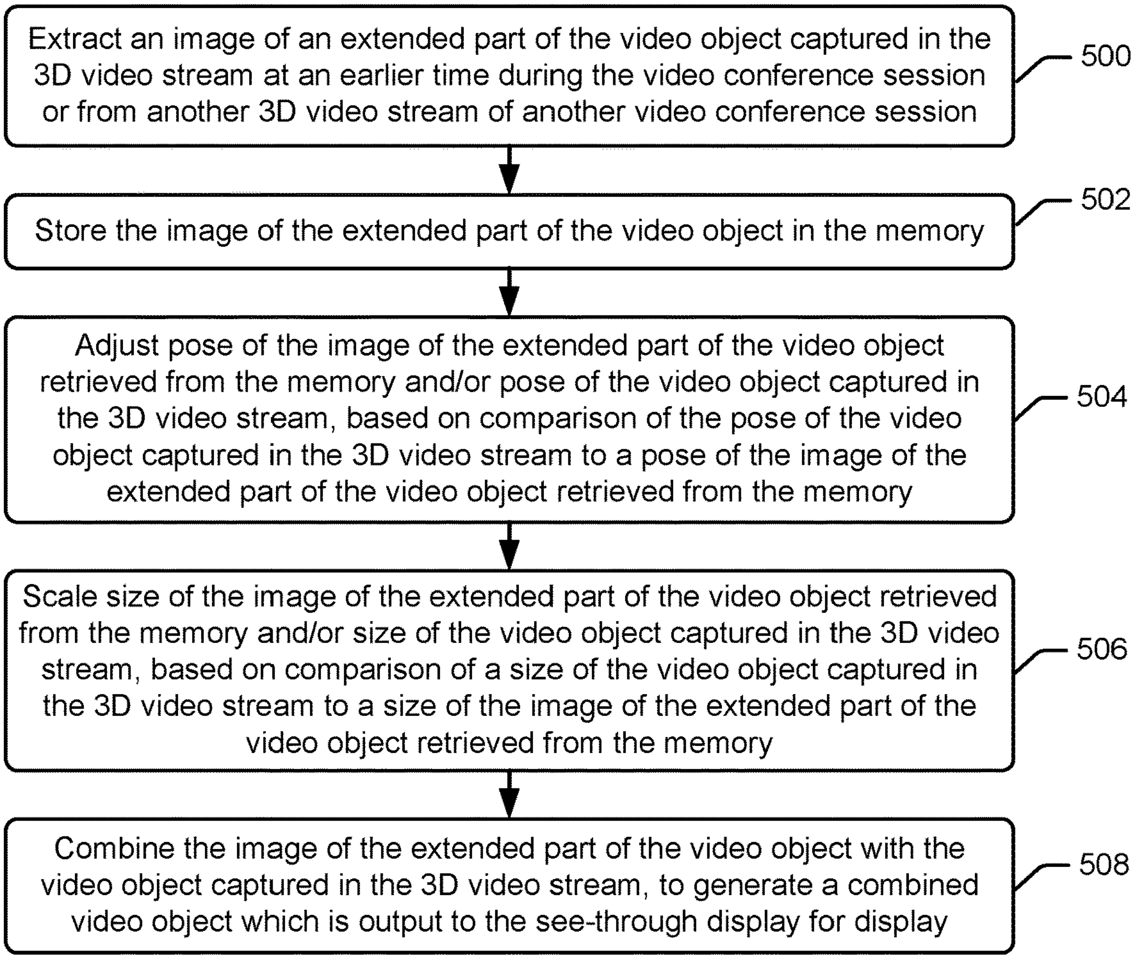

FIG. 5 illustrates a flowchart of corresponding operations that may be performed by the AR computing server 200 in accordance with some embodiments. Referring to FIG. 5, the operations extract 500 an image of an extended part of the video object captured in the 3D video stream at an earlier time during the conference session or from another 3D video stream of another conference session. The extended part of the video object may be extracted by copying to memory only the extended part of the video object without copying other objects, background, etc. in a video frame of the 3D video stream. The extended part of the video object is not captured in the 3D video stream at the time of the determination 312 of the pose of the video object. An example extended part of a video object can correspond to, for example, a video image of the remote participant's neck, torso, arms, etc. The operations store 502 the image of the extended part of the video object in the memory for subsequent use. The image of the extended part of the video object may be stored 502 in the image part repository 209 of the AR computing server 200 as shown in FIG. 2. The operations adjust 504 pose of the image of the extended part of the video object retrieved from the memory (e.g., the image part repository 209 of the AR computing server 200 shown in FIG. 2) and/or pose of the video object captured in the 3D video stream, based on comparison of the pose of the video object captured in the 3D video stream to a pose of the image of the extended part of the video object retrieved from the memory (e.g., the image part repository 209). The operations scale 506 size of the image of the extended part of the video object retrieved from the memory (e.g., the image part repository 209) and/or size of the video object captured in the 3D video stream, based on comparison of a size of the video object captured in the 3D video stream to a size of the image of the extended part of the video object retrieved from the memory. The operations then combine 508 the image of the extended part of the video object with the video object captured in the 3D video stream, to generate a combined video object which is output 318 to the see-through display 234 of the AR display device 220 for display.

The AR computing server 200 may extract the video object captured in the 3D video stream from the user device 210 to generate an extracted video stream which is output to the AR display device 220 for display through the see-through display 234. In an illustrative embodiment, the video object is one of a plurality of components of a scene captured in the 3D video stream by the 3D camera 212 of the user device 210. The operation by the AR computing server 200 to adjust 316 pose of the video object captured in the 3D video stream includes to extract the video object from the 3D video stream without the other components of the scene. The operation the operation by the AR computing server 200 to output 318 the video object to the see-through display 234 for display includes to output the extracted video object with the adjusted pose.

Although the AR computing server 200 is illustrated in FIG. 2 and elsewhere as being separate from the AR display device 220, in some other embodiments the AR computing server 200 is implemented as a component of the AR display device 220 and/or in another computing device. For example, some of the operations described herein as being performed by the AR computing server 200 may alternatively or additionally be performed by the AR display device 220, the user device 210, and/or another computing device.

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.,", which derives from the Latin phrase "exempli gratia," may be used to introduce or specify a general example or examples of a previously mentioned item, and is not intended to be limiting of such item. The common abbreviation "i.e.,", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the following examples of embodiments and their equivalents, and shall not be restricted or limited by the foregoing detailed description.

The invention claimed is:

1. An augmented reality (AR) computing server comprising:

a network interface configured to receive through a network a three-dimensional (3D) video stream from a user device during a conference session;

a processor connected to the network interface; and a memory storing instructions executable by the processor to perform operations to:

identify a video object captured in the 3D video stream;

determine an angular orientation of the video object captured in the 3D video stream;

obtain AR context information from an AR display device indicating how the video object is to be posed relative to a physical object viewable through a see-through display of the AR display device;

adjust the angular orientation of the video object captured in the 3D video stream based on the AR context information; and output the video object to the see-through display for display.

2. The AR computing server of claim 1, wherein:

the operation to determine the angular orientation of the video object captured in the 3D video stream, comprises to determine pose of features of a face captured in the 3D video stream; and the operation to adjust the angular orientation of the video object captured in the 3D video stream based on the AR context information comprises to rotate and/or translate the features of the face captured in the 3D video stream based on comparison of the angular orientation of the features of the face captured in the 3D video stream to the AR context information indication of how the features of the face are to be posed relative to the physical object viewable through the see-through display of the AR display device.

3. The AR computing server of claim 1, wherein the AR context information indicates an angular orientation of the physical object, and the operation to adjust the angular orientation of the video object captured in the 3D video stream based on the AR context information comprises to adjust the angular orientation of the video object captured in the 3D video stream based on comparison of the angular orientation of the video object to the angular orientation of the physical object.

4. The AR computing server of claim 1, wherein:

the operation to obtain the AR context information comprises to determine an angular orientation of the see-through display of the AR display device relative to the physical object captured in a video stream from a camera of the AR display device; and the operation to adjust the angular orientation of the video object captured in the 3D video stream comprises to adjust the angular orientation of the video object captured in the 3D video stream based on comparison of the angular orientation of the video object to the angular orientation of the see-through display of the AR display device relative to the physical object captured in a video stream from a camera of the AR display device.

5. The AR computing server of claim 4, wherein the operation to determine the angular orientation of the see-through display of the AR display device relative to the physical object captured in the video stream from the camera of the AR display device, comprises to:

identify poses of a plurality of physical objects captured in the video stream from the camera of the AR display device;

select one of the physical objects from among the plurality of physical objects based on the selected one of the physical objects satisfying a context selection rule; and perform the determination of the angular orientation of the see-through display relative to the angular orientation of the selected one of the physical objects.

6. The AR computing server of claim 5, wherein the operations further comprise to determine that one of the physical objects captured in the video stream from the camera of the AR display device satisfies the context selection rule based on the one of the physical objects having a shape that matches a defined shape of one of:

a seat on which the video object captured in the 3D video stream is to be displayed on the see-through display with an angular orientation viewed as appearing to be supported by the seat;

a table on which the video object captured in the 3D video stream is to be displayed on the see-through display with an angular orientation viewed as appearing to be supported by the table; and a floor on which the video object captured in the 3D video stream is to be displayed on the see-through display with an angular orientation viewed as appearing to be supported by the floor.

7. The AR computing server of claim 1, wherein the operations further comprise to:

adjust color and/or shading of the physical object which is output to the see-through display for display, based on color and/or shading of the physical object captured in the video stream from the camera of the AR display device.

8. The AR computing server of claim 1, wherein the operation to adjust the angular orientation of the video object captured in the 3D video stream further comprises to:

rotate and/or translate pose of the video object captured in the 3D video stream based on comparison of the angular orientation of the video object captured in the 3D video stream to the AR context information indication of how the video object is to be posed relative to the physical object viewable through the see-through display of the AR display device.

9. The AR computing server of claim 1, wherein the operation to adjust the angular orientation of the video object captured in the 3D video stream further comprises to:

scale size of the video object captured in the 3D video stream based on comparison of a size of the video object captured in the 3D video stream to the AR context information indication of a size of the physical object viewable through the see-through display of the AR display device.

10. The AR computing server of claim 1, wherein the operations further comprise to:

extract an image of an extended part of the video object captured in the 3D video stream at an earlier time during the conference session or from another 3D video stream of another conference session, wherein the extended part of the video object is not captured in the 3D video stream at the time of the determination of the angular orientation of the video object;

store the image of the extended part of the video object in the memory;

adjust the angular orientation of the image of the extended part of the video object retrieved from the memory and/or the angular orientation of the video object captured in the 3D video stream, based on comparison of the angular orientation of the video object captured in the 3D video stream to an angular orientation of the image of the extended part of the video object retrieved from the memory;

scale size of the image of the extended part of the video object retrieved from the memory and/or size of the video object captured in the 3D video stream, based on comparison of a size of the video object captured in the 3D video stream to a size of the image of the extended part of the video object retrieved from the memory; and combine the image of the extended part of the video object with the video object captured in the 3D video stream, to generate a combined video object which is output to the see-through display for display.

11. The AR computing server of claim 1, wherein:

the AR computing server comprises a network computing server; and the network interface is further configured to communicate through the network with the see-through display of the AR display device.

12. The AR computing server of claim 1, wherein the video object is one of a plurality of components of a scene captured in the 3D video stream, and the operation to adjust the angular orientation of the video object captured in the 3D video stream comprises to extract the video object from the 3D video stream without the other components of the scene; and the operation to output the video object to the see-through display for display comprises to output the extracted video object with the adjusted angular orientation.

13. A method by an augmented reality (AR) computing server comprising:

identifying a video object captured in a three-dimensional (3D) video stream received from a user device during a conference session;

determining an angular orientation of the video object captured in the 3D video stream;

obtaining AR context information from an AR display device indicating how the video object is to be posed relative to a physical object viewable through a see-through display of the AR display device;

adjusting the angular orientation of the video object captured in the 3D video stream based on the AR context information; and outputting the video object to the see-through display for display.

14. The method of claim 13, wherein:

the determining of the angular orientation of the video object captured in the 3D video stream, comprises determining pose of features of a face captured in the 3D video stream; and the adjusting the angular orientation of the video object captured in the 3D video stream based on the AR context information comprises rotating and/or translating the features of the face captured in the 3D video stream based on comparison of the angular orientation of the features of the face captured in the 3D video stream to the AR context information indication of how the features of the face are to be posed relative to the physical object viewable through the see-through display of the AR display device.

15. The method of claim 13, wherein the AR context information indicates an angular orientation of the physical object, and the adjusting the angular orientation of the video object captured in the 3D video stream based on the AR context information comprises adjusting the angular orientation of the video object captured in the 3D video stream based on comparison of the angular orientation of the video object to the angular orientation of the physical object.

16. The method of claim 13, wherein:

the obtaining the AR context information comprises determining an angular orientation of the see-through display of the AR display device relative to the physical object captured in a video stream from a camera of the AR display device; and the adjusting the angular orientation of the video object captured in the 3D video stream comprises adjusting the angular orientation of the video object captured in the 3D video stream based on comparison of the angular orientation of the video object to the angular orientation of the see-through display of the AR display device relative to the physical object captured in a video stream from a camera of the AR display device.

17. The method of claim 16, wherein the determining the angular orientation of the see-through display of the AR display device relative to the physical object captured in the video stream from the camera of the AR display device, comprises:

identifying poses of a plurality of physical objects captured in the video stream from the camera of the AR display device;

selecting one of the physical objects from among the plurality of physical objects based on the selected one of the physical objects satisfying a context selection rule; and performing the determination of the angular orientation of the see-through display relative to the angular orientation of the selected one of the physical objects.

18. The method of claim 17, further comprising determining that one of the physical objects captured in the video stream from the camera of the AR display device satisfies the context selection rule based on the one of the physical objects having a shape that matches a defined shape of one of:

a seat on which the video object captured in the 3D video stream is to be displayed on the see-through display with an angular orientation viewed as appearing to be supported by the seat;

a table on which the video object captured in the 3D video stream is to be displayed on the see-through display with an angular orientation viewed as appearing to be supported by the table; and a floor on which the video object captured in the 3D video stream is to be displayed on the see-through display with an angular orientation viewed as appearing to be supported by the floor.

19. The method of claim 16, further comprising:

adjusting color and/or shading of the physical object which is output to the see-through display for display, based on color and/or shading of the physical object captured in the video stream from the camera of the AR display device.

20. A computer program product comprising a non-transitory computer readable medium storing instructions executable by a processor of an augmented reality (AR) computing server to perform operations comprising:

identifying a video object captured in a three-dimensional (3D) video stream received from a user device during a conference session;

determining an angular orientation of the video object captured in the 3D video stream;

obtaining AR context information from an AR display device indicating how the video object is to be posed relative to a physical object viewable through a see-through display of the AR display device;

adjusting the angular orientation of the video object captured in the 3D video stream based on the AR context information; and outputting the video object to the see-through display for display.

* * * * *